(12) United States Patent
Zhou

(10) Patent No.: US 11,578,807 B2
(45) Date of Patent: Feb. 14, 2023

(54) OUTLET VALVE

(71) Applicant: Shanghai Kohler Electronics, Ltd., Shanghai (CN)

(72) Inventor: Xiaojun Zhou, Shanghai (CN)

(73) Assignee: SHANGHAI KOHLER ELECTRONICS, LTD., Shanghai (CN)

( * ) Notice: Subject to any disclaimer, the term of this patent is extended or adjusted under 35 U.S.C. 154(b) by 0 days.

(21) Appl. No.: 17/363,185

(22) Filed: Jun. 30, 2021

(65) Prior Publication Data

US 2022/0018456 A1    Jan. 20, 2022

(30) Foreign Application Priority Data

Jul. 17, 2020  (CN) .......................... 202010690613.8

(51) Int. Cl.
*F16K 11/24* (2006.01)
*E03B 7/07* (2006.01)
(Continued)

(52) U.S. Cl.
CPC .............. *F16K 11/24* (2013.01); *E03B 7/075* (2013.01); *E03B 7/08* (2013.01); *F16K 27/029* (2013.01); *F16K 27/0263* (2013.01)

(58) Field of Classification Search
CPC .. F16K 11/24; F16K 15/1825; F16K 15/1826; F16K 17/0453; F16K 17/105; F16K 17/17; F16K 31/402
See application file for complete search history.

(56) References Cited

U.S. PATENT DOCUMENTS 3,282,556 A * 11/1966 Hancook ............... F16K 31/402
                                                              251/30.02
3,369,565 A *  2/1968 Haggard, Jr. ......... F16K 31/402
                                                              137/625.11
(Continued)

FOREIGN PATENT DOCUMENTS

CN           103322215 A      9/2013

OTHER PUBLICATIONS

Extended European Search Report on EP App. Ser. No. 21186126.5 dated Dec. 17, 2021 (9 pages).
(Continued)

*Primary Examiner* — Reinaldo Sanchez-Medina
(74) *Attorney, Agent, or Firm* — Foley & Lardner LLP

(57) ABSTRACT

An outlet valve includes a valve body, a solenoid valve, and a manual operating member. The valve body includes a water inlet, a water outlet, a water storage cavity, a drain waterway, a first waterway, a second waterway, and a waterproof membrane. The first waterway is coupled to the drain waterway through a first drain opening. The second waterway is coupled to the drain waterway through a second drain opening. The waterproof membrane is configured to separate the water outlet cavity from the water storage cavity. The first waterway comprises a first plug coupled to an output end of the solenoid valve. The first plug is configured to control the opening and closing of the first drain opening. The second waterway comprises a second plug coupled to the manual operating member. The second plug is configured to control the opening and closing of the second drain opening.

20 Claims, 5 Drawing Sheets

(51) Int. Cl.
  *E03B 7/08* (2006.01)
  *F16K 27/02* (2006.01)

(56) References Cited

U.S. PATENT DOCUMENTS

| | | | | |
|---|---|---|---|---|
| 3,791,619 | A * | 2/1974 | Pett | F16K 31/402 251/45 |
| 4,226,259 | A * | 10/1980 | Szekely | F16K 31/365 137/269 |
| 5,131,427 | A * | 7/1992 | Latza | G05D 16/166 137/489 |
| 5,632,465 | A * | 5/1997 | Cordua | F16K 7/126 251/30.02 |
| 6,877,714 | B2 * | 4/2005 | Hall | F16K 31/406 137/270 |
| 7,806,382 | B1 * | 10/2010 | Palumbo | F16K 31/402 251/30.03 |
| 8,235,352 | B2 * | 8/2012 | Irwin | F16K 31/402 251/14 |
| 8,490,646 | B2 * | 7/2013 | Bush | F16K 31/1264 251/30.02 |
| 8,505,566 | B2 * | 8/2013 | Nguyen | F16K 31/402 137/15.09 |
| 2008/0289693 | A1 * | 11/2008 | Irwin | F16K 31/402 137/12 |
| 2017/0059075 | A1 | 3/2017 | Ueno | |

OTHER PUBLICATIONS

First Chinese Office Action on CN Appl. Ser. No. 202010690613.8 dated Sep. 30, 2021 (9 pages).
Indian Office Action issued in connection with IN Appl. Ser. No. 202114032254 dated Mar. 4, 2022 (6 pages).

* cited by examiner

OUTLET VALVE

CROSS-REFERENCE TO RELATED PATENT APPLICATIONS

This application claims the benefit of and priority to Chinese Utility Model No. 202010690613.8, filed on Jul. 17, 2020, the entire disclosure of which is hereby incorporated by reference herein.

TECHNICAL FIELD

The present disclosure generally relates to the field of water valve technologies, and more specifically, to an outlet valve.

BACKGROUND

Water valves in the prior art are generally controlled by solenoid valves. When the solenoid valves fail, the water valves cannot be used any longer.

In the prior art, to solve the above problem, a double waterway switching mode is used for control. Specifically, a solenoid valve controls water in one waterway and a mechanical valve controls water in the other waterway. When the solenoid valve fails, the water in the other waterway is opened by the mechanical valve, and the water in the waterway where the solenoid valve locates is closed. According to the above arrangement, two waterways need to be arranged between a water inlet end and a water outlet end of a valve body, and a special switching valve core needs to be arranged between the two waterways, so that a structure is complex.

SUMMARY

At least one embodiment relates to an outlet valve includes a valve body, a solenoid valve coupled to the valve body, and a manual operating member coupled to the valve body. The valve body includes a water inlet, a water outlet, a water storage cavity, a drain waterway, a first waterway, a second waterway, and a waterproof membrane. The first waterway is coupled to the drain waterway through a first drain opening. The second waterway is coupled to the drain waterway through a second drain opening. The waterproof membrane is located at least partially in the water storage cavity. The waterproof membrane is configured to hermetically separate the water outlet cavity from the water storage cavity. The first waterway comprises a first plug coupled to an output end of the solenoid valve. The first plug is configured to control the opening and closing of the first drain opening. The second waterway comprises a second plug coupled to the manual operating member. The second plug configured to control the opening and closing of the second drain opening.

BRIEF DESCRIPTION OF THE DRAWINGS

Through the following description of the embodiments in conjunction with the drawings, the above-mentioned features and technical advantages of the present disclosure will become clearer and easier to understand.

DETAILED DESCRIPTION OF THE EMBODIMENTS

Figure 1:
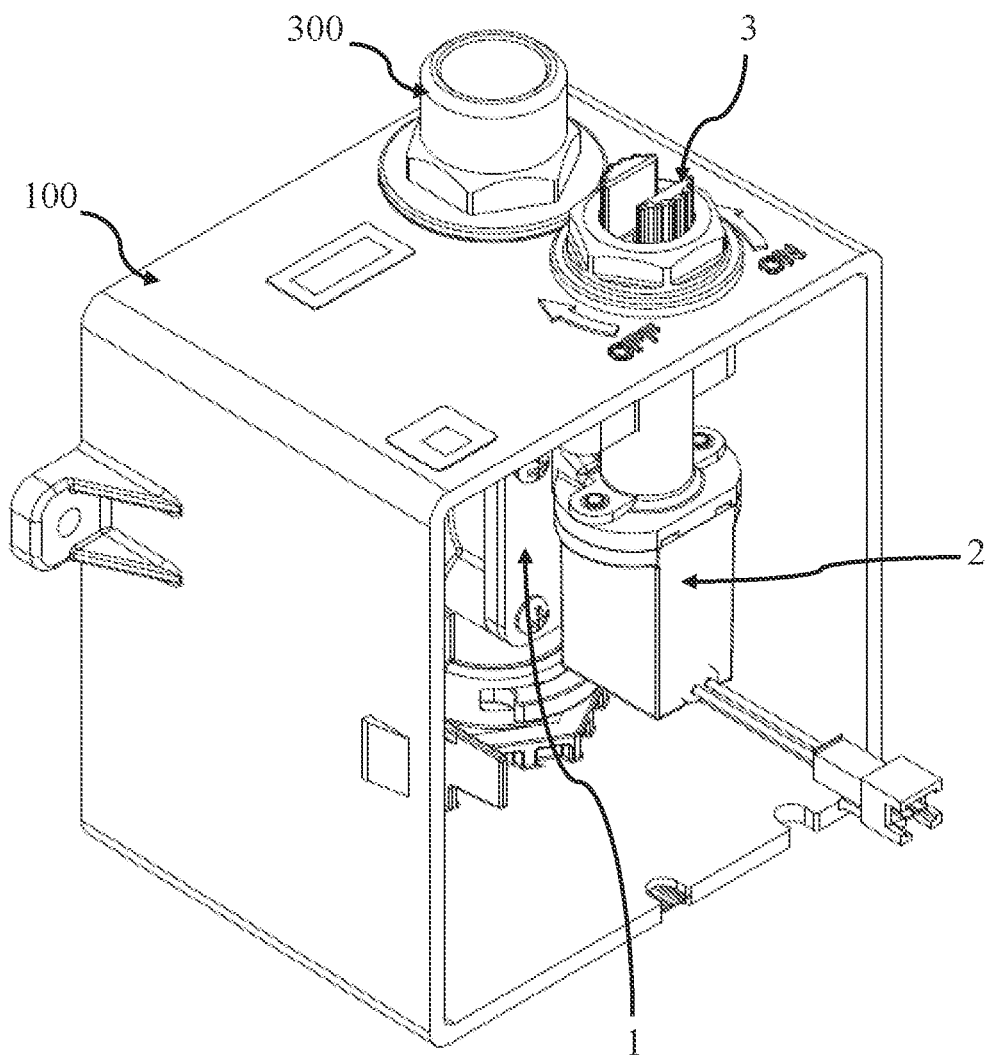
FIG. 1 is a stereoscopic diagram of an outlet valve, according to an exemplary embodiment.

According to an exemplary embodiment, an outlet valve, including a valve body, a solenoid valve and a manual operating member, wherein the valve body includes a water inlet cavity, a water outlet cavity, a water storage cavity, a first waterway, a second waterway and a drain waterway; a waterproof membrane is arranged between the water outlet cavity and the water inlet cavity; the waterproof membrane is provided with a water replenishing hole; the first waterway is communicated with the drain waterway through a first drain opening, and the second waterway is communicated with the drain waterway through a second drain opening; the first waterway is internally provided with a first plug, and the first plug is connected with an output end of the solenoid valve; and the second waterway is internally provided with a second plug, and the second plug is connected with the manual operating member. The outlet valve disclosed by the disclosure can implement solenoid valve control and manual control, the waterproof membrane does not need to be opened by a mechanical action in the whole process, and two waterways do not need to be arranged between the water inlet cavity and the water outlet cavity to implement a switching function, so that the outlet valve is simple in structure, convenient to control, and convenient for a user to use.

The present disclosure aims to provide an outlet valve simple in structure and convenient to control.

The technical solutions of the present disclosure provide an outlet valve, which includes a valve body, a solenoid valve mounted on the valve body, and a manual operating member mounted on the valve body.

According to an exemplary embodiment, the valve body includes a water inlet cavity, a water outlet cavity, a water storage cavity, a first waterway, a second waterway, and a drain waterway.

According to an exemplary embodiment, a waterproof membrane for controlling connection and disconnection between the water outlet cavity and the water inlet cavity is arranged between the water outlet cavity and the water inlet cavity.

According to an exemplary embodiment, the waterproof membrane is at least partially located in the water storage cavity, and the waterproof membrane hermetically separates the water outlet cavity from the water storage cavity.

According to an exemplary embodiment, the waterproof membrane is provided with a water replenishing hole, and the water replenishing hole communicates the water inlet cavity with the water storage cavity.

According to an exemplary embodiment, the first waterway is communicated with the drain waterway through a first drain opening, and the second waterway is communicated with the drain waterway through a second drain opening.

According to an exemplary embodiment, the first waterway is also internally provided with a first plug for controlling opening and closing of the first drain opening, and the first plug is connected with an output end of the solenoid valve.

According to an exemplary embodiment, the second waterway is also internally provided with a second plug for controlling opening and closing of the second drain opening, and the second plug is connected with the manual operating member.

According to an exemplary embodiment, the valve body is internally provided with an annular separating rib.

According to an exemplary embodiment, a water inlet of the annular separating rib faces the water storage cavity, and the water inlet is communicated with the water inlet cavity.

According to an exemplary embodiment, a water outlet of the annular separating rib is communicated with the water outlet cavity.

According to an exemplary embodiment, the waterproof membrane is arranged on the water inlet of the annular separating rib.

According to an exemplary embodiment, the water storage cavity is also internally provided with a first elastic member for driving the waterproof membrane to move towards the water inlet.

According to an exemplary embodiment, the waterproof membrane includes a support and a rubber gasket arranged on the support.

According to an exemplary embodiment, the rubber gasket is arranged on the annular separating rib, and the first elastic member is contacted with the support.

According to an exemplary embodiment, the water replenishing hole penetrates through the rubber gasket and the support.

According to an exemplary embodiment, one end of the first waterway close to the first drain opening is provided with a first chamber, and the first plug is slidably arranged in the first chamber.

According to an exemplary embodiment, one end of the second waterway close to the second drain opening is provided with a second chamber, and the second plug is slidably arranged in the second chamber.

According to an exemplary embodiment, the manual operating member includes a handle, a connecting sleeve, and a mandrel.

According to an exemplary embodiment, the connecting sleeve is mounted in the valve body.

According to an exemplary embodiment, the mandrel passes through the connecting sleeve, one end of the mandrel is fixedly connected with the handle, and the other end of the mandrel is fixedly connected with the second plug.

According to an exemplary embodiment, the handle is at least partially located outside the connecting sleeve, and is capable of pulling the mandrel to drive the second plug away from the second drain opening.

According to an exemplary embodiment, a second elastic member assisting the second plug in blocking the second drain opening is connected onto the connecting sleeve.

According to an exemplary embodiment, the handle is rotatably connected with the connecting sleeve.

According to an exemplary embodiment, the handle is slidably connected with the connecting sleeve.

According to an exemplary embodiment, one side of the second plug facing the mandrel is also provided with a baffle.

According to an exemplary embodiment, the mandrel passes through the baffle; and According to an exemplary embodiment, one side of the second plug facing the baffle is provided with at least one elastic convex portion.

By adopting the above technical solutions, the present disclosure has the following beneficial effects.

According to the outlet valve provided by the present disclosure, when the first plug and the second plug block the first drain opening and the second drain opening respectively, water in the water inlet cavity enters the water storage cavity through the water replenishing hole, and a water pressure in the water storage cavity is increased, so that the waterproof membrane blocks a channel between the water inlet cavity and the water outlet cavity, and the outlet valve is closed and cannot discharge water. When the outlet valve needs to be opened, the first drain opening and/or the second drain opening may be selectively opened, the water in the water storage cavity is quickly discharged to the water outlet cavity through the first waterway and/or the second waterway and the drain waterway, the water pressure in the water storage cavity is instantly decreased, under an action of the water pressure in the water inlet cavity, the waterproof membrane opens the channel between the water inlet cavity and the water outlet cavity, the water in the water inlet cavity enters the water outlet cavity, and the outlet valve is opened and may supply water.

Therefore, according to the outlet valve provided by the present disclosure, the waterproof membrane does not need to be opened by a mechanical action in the whole process, and two waterways do not need to be arranged between the water inlet cavity and the water outlet cavity to implement a switching function, so that the outlet valve is simple in structure, convenient to control, and convenient for a user to use.

As shown in FIG. 1 to FIG. 6, an outlet valve provided by an embodiment of the present disclosure includes a valve body 1, a solenoid valve 2 mounted on the valve body 1, and a manual operating member 3 mounted on the valve body 1.

The valve body 1 includes a water inlet cavity 11, a water outlet cavity 12, a water storage cavity 13, a first waterway 14, a second waterway 15, and a drain waterway 16.

A waterproof membrane 4 for controlling connection and disconnection between the water outlet cavity 12 and the water inlet cavity 11 is arranged between the water outlet cavity 12 and the water inlet cavity 11.

The waterproof membrane 4 is at least partially located in the water storage cavity 13, and the waterproof membrane 4 hermetically separates the water outlet cavity 12 from the water storage cavity 13.

The waterproof membrane 4 is provided with a water replenishing hole 40, and the water replenishing hole 40 communicates the water inlet cavity 11 with the water storage cavity 13.

The first waterway 14 is communicated with the drain waterway 16 through a first drain opening 141, and the second waterway 15 is communicated with the drain waterway 16 through a second drain opening 151.

The first waterway 14 is also internally provided with a first plug 5 for controlling opening and closing of the first drain opening 141, and the first plug 5 is connected with an output end of the solenoid valve 2.

The second waterway 15 is also internally provided with a second plug 6 for controlling opening and closing of the second drain opening 151, and the second plug 6 is connected with the manual operating member 3.

According to the outlet valve provided by the embodiment of the present disclosure, the valve body 1 and the solenoid valve 2 are mounted in a housing 100. The housing 100 is also connected with a water inlet connector 200 and a water outlet connector 300. When the outlet valve is mounted on a pipeline, the water inlet connector 200 is connected with a water pipe, and the water outlet connector 300 is connected with a faucet or a water consuming device.

The water inlet cavity 11 in the valve body 1 is communicated with the water inlet connector 200, and the water outlet cavity 12 in the valve body 1 is communicated with the water outlet connector 300.

The water storage cavity 13 in the valve body 1 is separated from the water inlet cavity 11 and the water outlet cavity 12. The first waterway 14 and the second waterway 15 are respectively communicated with the water storage cavity 13. The first waterway 14 and the second waterway 15 are respectively communicated with the drain waterway 16 through the first drain opening 141 and the second drain opening 151. The drain waterway 16 is communicated with the water outlet cavity 12.

The waterproof membrane 4 is assembled in a channel between the water inlet cavity 11 and the water outlet cavity 12, and is used for controlling connection and disconnection of a waterway between the water inlet cavity 11 and the water outlet cavity 12, thus controlling opening and closing of the outlet valve. The waterproof membrane 4 hermetically separates the water outlet cavity 12 from the water storage cavity 13, and there is no waterway connection between the water outlet cavity 12 and the water storage cavity 13. The waterproof membrane 4 is provided with a water replenishing hole 40, the water storage cavity 13 is communicated with the water inlet cavity 11 through the water replenishing hole 40, and there is waterway connection between the water outlet cavity 12 and the water storage cavity 13. A hole diameter of the water replenishing hole 40 is generally small, the water replenishing hole is used for slowly replenishing water from the water inlet cavity 11 to the water storage cavity 13, and a water pressure in the water storage cavity 13 is changed by a volume of water replenished.

A water outlet of the water inlet cavity 11 faces the water storage cavity 13 or the waterproof membrane 4, so that the water pressure in the water inlet cavity 11 may act on the waterproof membrane 4, which can drive the waterproof membrane 4 to open the waterway between the water inlet cavity 11 and the water outlet cavity 12.

The waterproof membrane 4 can move under the change of the water pressure between the water inlet cavity 11 and the water storage cavity 13 to open or close the channel between the water inlet cavity 11 and the water outlet cavity 12.

When the water pressure in the water storage cavity 13 is basically equal to the water pressure in the water inlet cavity 11 or meets a certain condition, the waterproof membrane 4 moves towards the channel between the water inlet cavity 11 and the water outlet cavity 12 to close the waterway between the water inlet cavity 11 and the water outlet cavity 12, and the outlet valve is closed and cannot discharge water.

When the water pressure in the water storage cavity 13 is lower than the water pressure in the water inlet cavity 11 or meets a certain condition, the waterproof membrane 4 moves towards an interior of the water storage cavity 13 to open the waterway between the water inlet cavity 11 and the water outlet cavity 12, and the outlet valve is opened and may discharge water.

The first plug 5 is arranged on one side of the first waterway 14 close to the first drain opening 141. The first plug 5 can control opening and closing of the first drain opening 141.

The first plug 5 is connected with the output end of the solenoid valve 2. Under an action of the solenoid valve 2, the first plug 5 may move towards the first drain opening 141 in the first waterway 14 to block the first drain opening 141. Under an action of the solenoid valve 2, the first plug 5 may also move away from the first drain opening 141 in the first waterway 14 to open the first drain opening 141.

The first plug 5 is arranged on one side of the second waterway 15 close to the second drain opening 151, and the second plug 6 can control opening and closing of the second drain opening 151.

The second plug 6 is connected with the manual operating member 3. The manual operating member 3 may be a mechanical transmission member, such as a handle, a button, etc. The manual operating member 3 may push the second plug 6 to move towards the second drain opening 151 in the second waterway 15 to close the second drain opening 151. The manual operating member 3 may pull the second plug 6 to move away from the second drain opening 151 in the second waterway 15 to open the second drain opening 151.

The first plug 5 and the second plug 6 may be leather caps or rubber plugs.

When the outlet valve is in an initial state, the outlet valve is closed. At the moment, the first plug 5 and the second plug 6 block the first drain opening 141 and the second drain opening 151 respectively. In the state, water in the water inlet cavity 11 may enter the water storage cavity 13 through the water replenishing hole 40, and the water pressure in the water storage cavity 13 is increased to be basically equal to the water pressure in the water inlet cavity 11. The waterproof membrane 4 is kept to be sealed in the channel between the water inlet cavity 11 and the water outlet cavity 12. At the moment, the waterway between the water inlet cavity 11 and the water outlet cavity 12 is disconnected, and the outlet valve cannot discharge water.

When the outlet valve needs to be opened, the first drain opening 141 may be selectively opened by moving the first plug 5 through the solenoid valve 2, the second drain opening 151 may be selectively opened by moving the second plug 6 through the manual operating member 3, and the first drain opening 141 and the second drain opening 151 may also be selectively opened at the same time. After the first drain opening 141 and/or the second drain opening 151 are opened, the water in the water storage cavity 13 enters the drain waterway 16 through the first waterway 14 and/or the second waterway 15, and then is quickly discharged to the water outlet cavity 12 through the drain waterway 16. At the moment, the water pressure in the water storage cavity 13 is decreased instantly, and under an action of the water pressure in the water inlet cavity 11, the waterproof membrane 4 moves towards the interior of the water storage cavity 13, thus opening the channel between the water inlet cavity 11 and the water outlet cavity 12, and then the waterway between the water inlet cavity 11 and the water outlet cavity 12 is connected, the water in the water inlet cavity 11 enters the water outlet cavity 12, and the outlet valve is opened and may supply water.

Therefore, the outlet valve provided by the present disclosure may implement solenoid valve control and manual control. The second plug 6 is kept to block the second drain opening 151, and the solenoid valve control may be used separately, which is convenient for automatically controlling opening and closing of the outlet valve. The first plug 5 is kept to block the first drain opening 141, and the manual control may be used separately, so that the outlet valve does not need to be energized. When the solenoid valve 2 is failed or not energized, the manual control may also be used, and the outlet valve may be continuously used.

According to the outlet valve provided by the present disclosure, the waterproof membrane 4 does not need to be opened by a mechanical action in the whole process, and two waterways do not need to be arranged between the water inlet cavity 11 and the water outlet cavity 12 to implement a switching function, so that the outlet valve is simple in structure, convenient to control, and convenient for a user to use.

Figure 3:
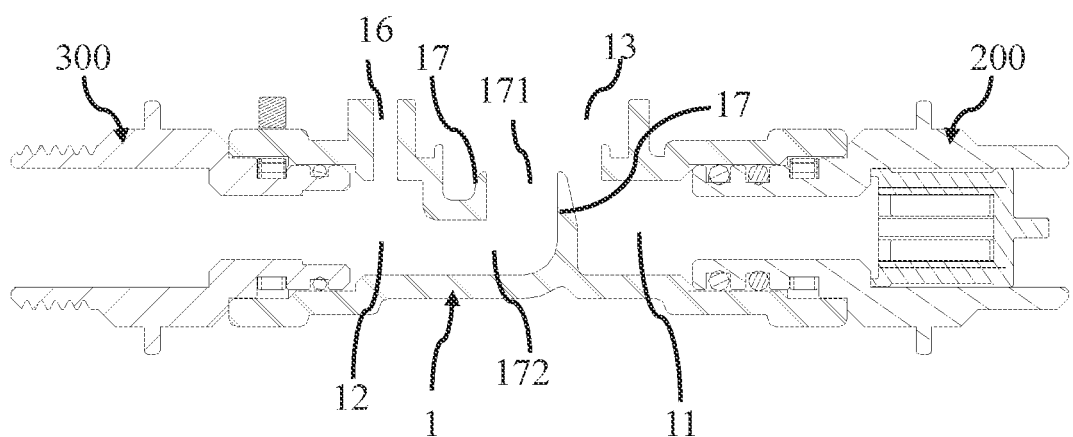
FIG. 3 is a detailed view of a valve body, a water inlet connector, and a water outlet connector of FIG. 2, according to an exemplary embodiment.
Figure 6:
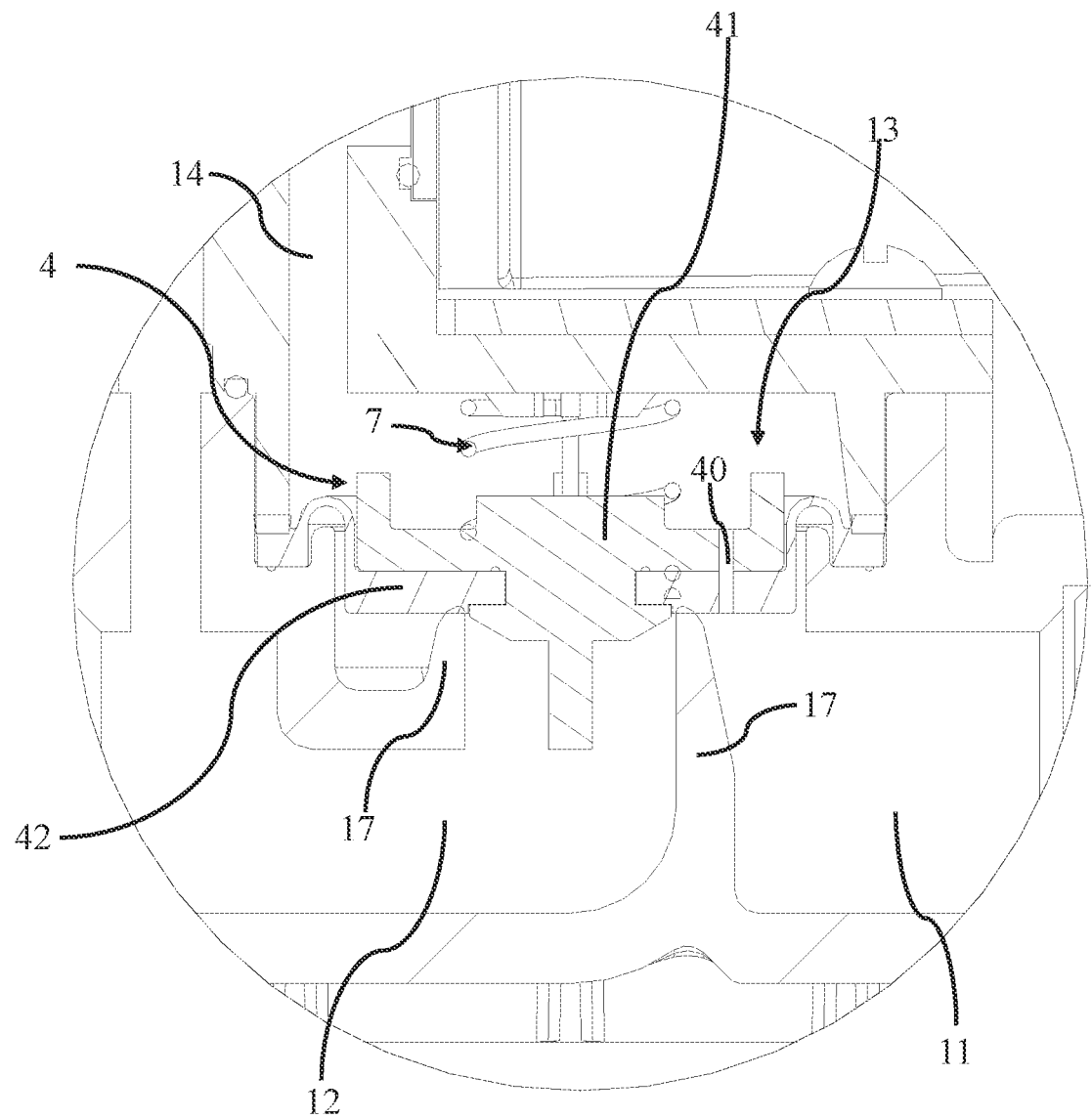
FIG. 6 is an enlarged view of a waterproof membrane arranged on an annular separating rib of FIG. 3, according to an exemplary embodiment.

In one of the embodiments, as shown in FIG. 3 and FIG. 6, the valve body 1 is internally provided with an annular separating rib 17.

A water inlet 171 of the annular separating rib 17 faces the water storage cavity 13, and the water inlet 171 is communicated with the water inlet cavity 11.

A water outlet 172 of the annular separating rib 17 is communicated with the water outlet cavity 12.

The waterproof membrane 4 is arranged on the water inlet 171 of the annular separating rib 17.

The annular separating rib 17 is integrally arranged in the valve body 1, which is the channel communicating the water inlet cavity 11 with the water outlet cavity 12. The annular separating rib 17 is composed of a ring of convex rib, thus forming a cylindrical channel.

The water inlet 171 of the annular separating rib 17 faces the water storage cavity 13, and the water inlet 171 is communicated with the water inlet cavity 11 through a water flow channel. The water outlet 172 of the annular separating rib 17 is kept to be communicated with the water outlet cavity 12.

The waterproof membrane 4 is arranged on the water inlet 171.

When the waterproof membrane 4 is sealed on the water inlet 171, the water inlet 171 is closed, the waterway between the water inlet cavity 11 and the water outlet cavity 12 is disconnected, and the outlet valve is closed and cannot discharge water.

When the waterproof membrane 4 is away from the water inlet 171 under the action of the water pressure, the water inlet 171 is opened, the waterway between the water inlet cavity 11 and the water outlet cavity 12 is connected, and the outlet valve is opened and may discharge water.

By arranging the waterproof membrane 4 on the annular separating rib 17, it is convenient to assemble the waterproof membrane 4, and is also convenient to seal and open the water inlet 171 through the waterproof membrane 4.

No matter how the waterproof membrane 4 moves, a peripheral edge of the waterproof membrane tightly seals the water storage cavity 13.

In one of the embodiments, as shown in FIG. 6, the water storage cavity 13 is also internally provided with a first elastic member 7 for driving the waterproof membrane 4 to move towards the water inlet 171.

The first elastic member 7 may be a spring, a plug spring, a disc spring, an elastic piece, and the like.

The first elastic member 7 assists the waterproof membrane 4 in resetting to seal the water inlet 171. Since the first elastic member 7 and the water pressure in the water inlet cavity 11 have opposite forces on the waterproof membrane 4, when the waterproof membrane 4 is away from the water inlet 171, the first elastic member 7 exerts a reaction force, which may control an opening degree of the waterproof membrane 4, thus controlling a water discharge volume of the outlet valve.

Different models of first elastic members 7 may be selected to control the water discharge volume of the outlet valve as needed. If an elastic force of the first elastic member 7 is large, under an action of a same water pressure, the opening degree of the waterproof membrane 4 is small, and the water discharge volume of the outlet valve is low. If the elastic force of the first elastic member 7 is small, under the action of the same water pressure, the opening degree of the waterproof membrane 4 is large, and the water discharge volume of the water outlet valve is high. In one of the embodiments, as shown in FIG. 6, the waterproof membrane 4 includes a support 41 and a rubber gasket 42 arranged on the support 41.

The rubber gasket 42 is arranged on the annular separating rib 17, and the first elastic member 7 is contacted with the support 41.

The water replenishing hole 40 penetrates through the rubber gasket 42 and the support 41.

One end of the first elastic member 7 is fixed on a cavity wall of the water storage cavity 13, and the other end of the first elastic member is connected or contacted with the support 41.

The support 41 plays a role of bearing force, which is used for bearing an acting force of the first elastic member 7, so as to avoid the first elastic member 7 from directly acting on the rubber gasket 42 and affecting a service life of the rubber gasket 42.

A peripheral edge of the rubber gasket 42 is kept to be sealed with the water storage cavity 13, and a main body part of the rubber gasket 42 may be covered on or away from the water inlet 171.

When a sum of the water pressure in the water storage cavity 13 and the acting force of the first elastic member 7 is basically equal to the water pressure in the water inlet cavity 11 or meets a certain condition, the support 41 drives the rubber gasket 42 to be covered on the water inlet 171 to close the waterway between the water inlet cavity 11 and the water outlet cavity 12.

When the first drain opening 141 and/or the second drain opening 151 are opened, so that the sum of the water pressure in the water storage cavity 13 and the acting force of the first elastic member 7 is smaller than the water pressure in the water inlet cavity 11, the water pressure in the water inlet cavity 11 may overcome the acting force of the first elastic member 7, which drives the support 41 to drive the rubber gasket 42 to move towards the interior of the water storage cavity 13, the water inlet 171 is opened, and the waterway between the water inlet cavity 11 and the water outlet cavity 12 is opened.

Figure 2:
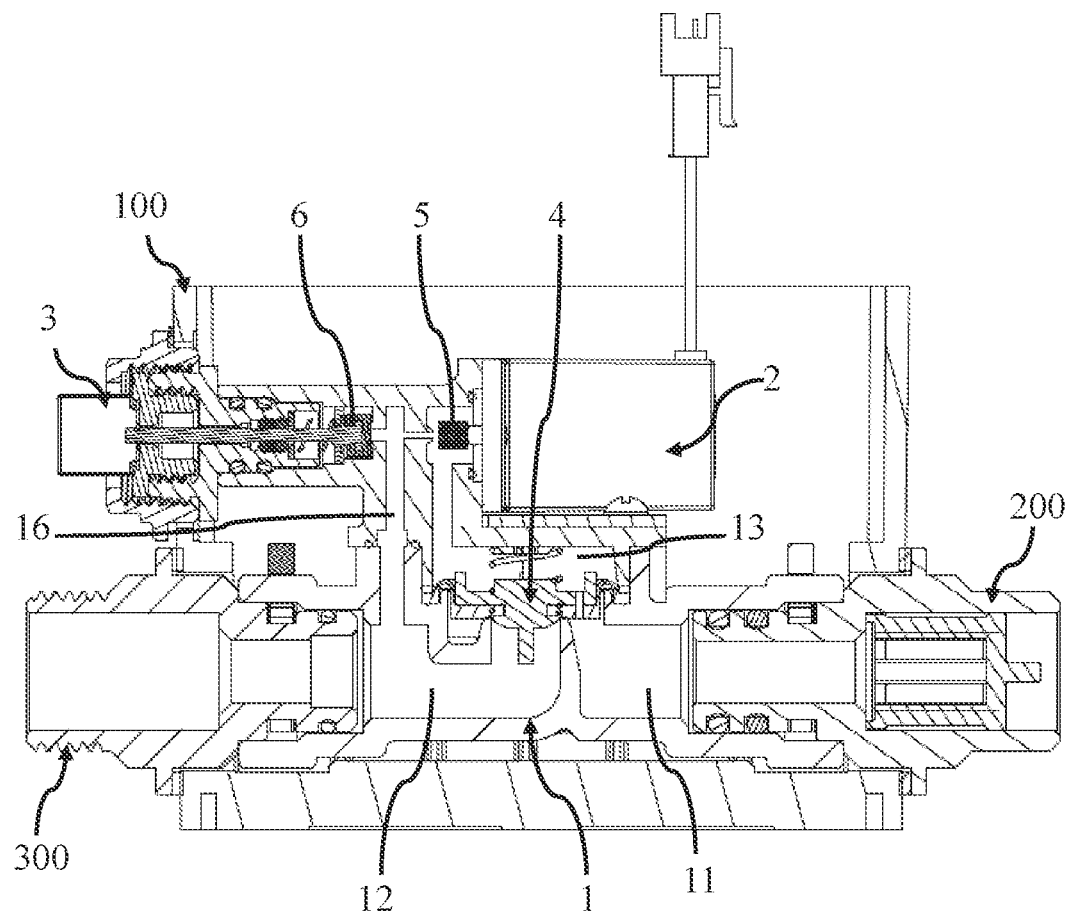
FIG. 2 is a sectional view of the outlet valve of FIG. 1, according to an exemplary embodiment.
Figure 4:
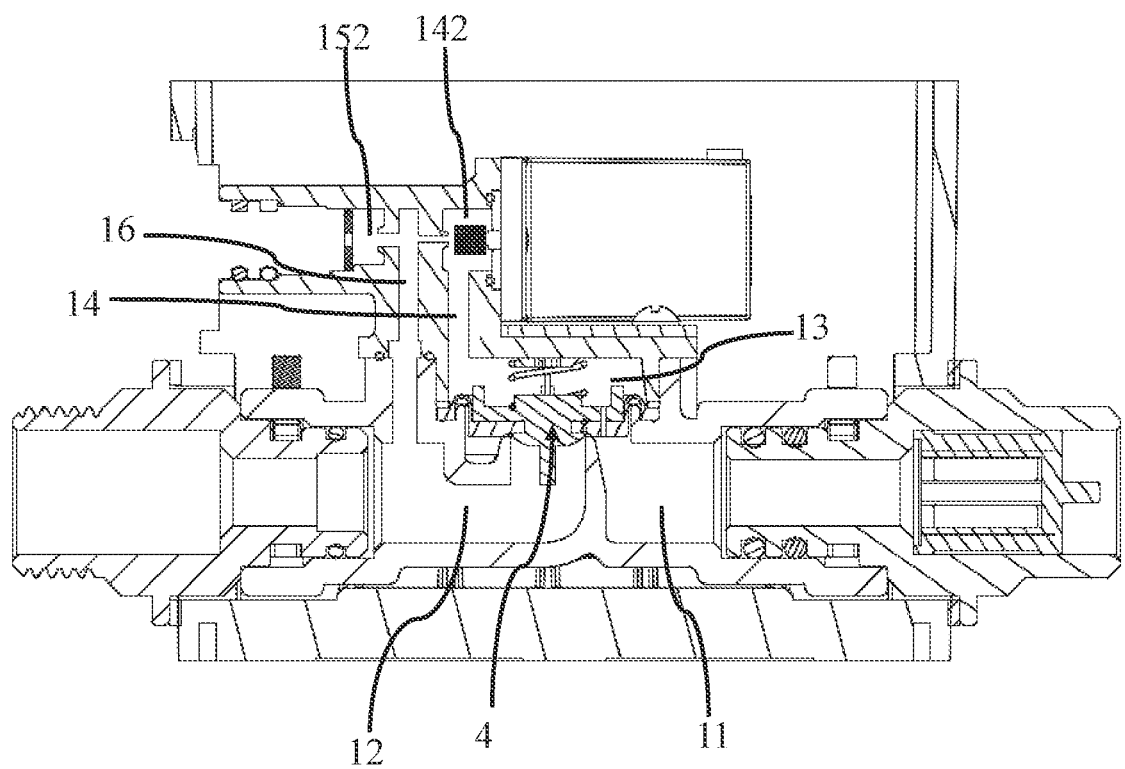
FIG. 4 is a schematic diagram of a water inlet cavity, a water storage cavity, a water outlet cavity, a first waterway, and a drain waterway arranged in the valve body of FIG. 3, according to an exemplary embodiment.
Figure 5:
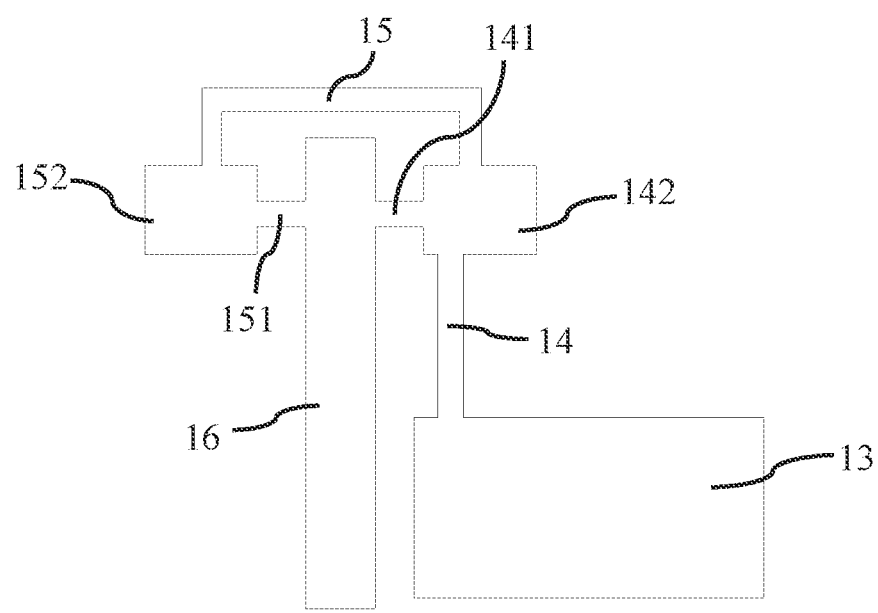
FIG. 5 is a schematic diagram of water storage cavity, the first waterway, the second waterway, and the drive waterway of FIG. 2, according to an exemplary embodiment.

In one of the embodiments, as shown in FIG. 2, FIG. 4, and FIG. 5, one end of the first waterway 14 close to the first drain opening 141 is provided with a first chamber 142, and the first plug 5 is slidably arranged in the first chamber 142.

The first chamber 142 is communicated with the first drain opening 141, and the first chamber 142 has a large volume, which is convenient for mounting the first plug 5. The first plug 5 may slide in the first chamber 142. The first chamber 142 has the large volume, and when the first plug 5 opens the first drain opening 141, the first plug 5 may slide to a rear side of the first chamber 142 without hindering a water flow in the first waterway 14. An output end of the solenoid valve 2 is inserted into the first chamber 142. The output end of the solenoid valve 2 is sealed with a chamber wall of the first chamber 142 by a sealing ring, which may avoid water leakage.

According to exemplary embodiment, as shown in FIG. 5, the second waterway 15 is communicated with the first chamber 142. The second waterway 15 is communicated with the water storage cavity 13 through the first waterway 14, so that a path of the second waterway 15 can be shortened, thus being convenient for arrangement.

In one of the embodiments, one end of the second waterway 15 close to the second drain opening 151 is provided with a second chamber 152, and the second plug 6 is slidably arranged in the second chamber 152.

The second chamber 152 is communicated with the second drain opening 151, and the second chamber 152 has a large volume, which is convenient for mounting the second plug 6. The first plug 5 may slide in the second chamber 152. The second chamber 152 has the large volume, and when the second plug 6 opens the second drain opening 151, the second plug 6 may slide to a rear side of the second chamber 152 without hindering a water flow in the second waterway 15.

A mandrel 33 of the manual operating member 3 is inserted into the second chamber 152. The mandrel 33 is sealed with a chamber wall of the second chamber 152 by a sealing ring, which may avoid water leakage.

Figure 7:
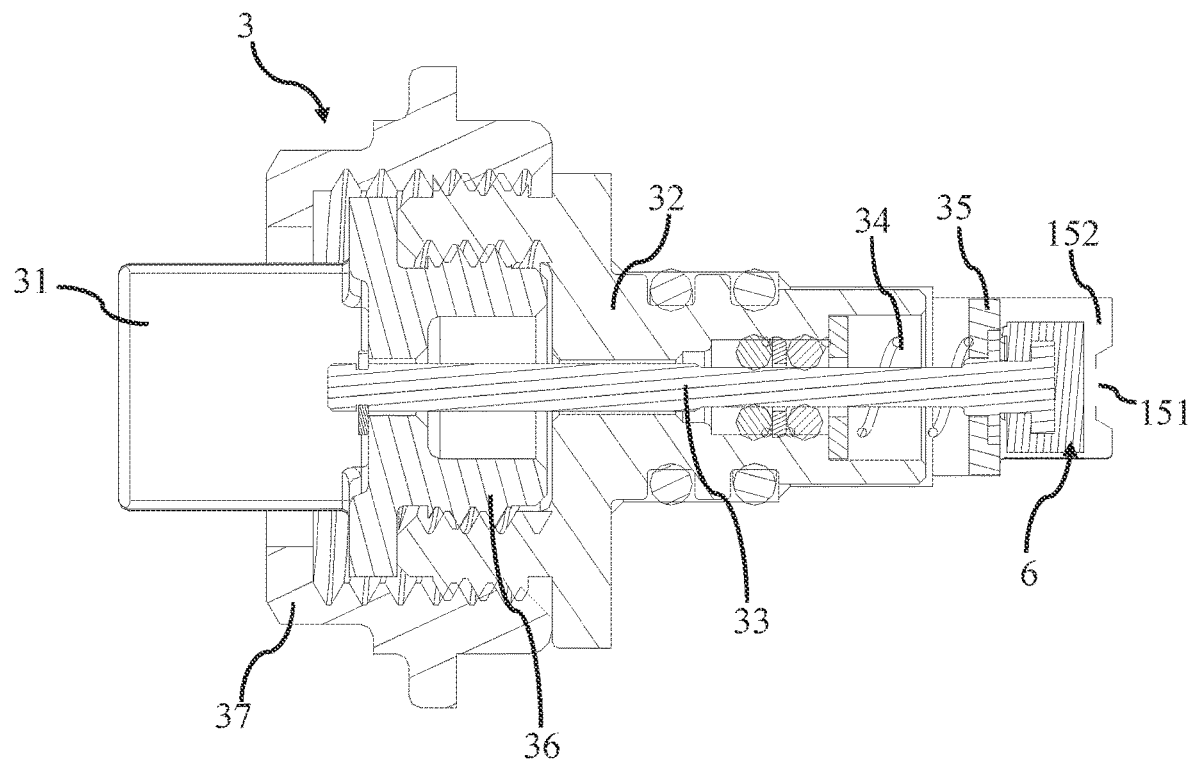
FIG. 7 is a sectional view of a manual operating member and a second plug of FIG. 4, according to an exemplary embodiment.

In one of the embodiments, as shown in FIG. 2 and FIG. 7, the manual operating member 3 includes a handle 31, a connecting sleeve 32, and the mandrel 33.

The connecting sleeve 32 is mounted in the valve body 1.

The mandrel 33 passes through the connecting sleeve 32, one end of the mandrel 33 is fixedly connected with the handle 31, and the other end of the mandrel 33 is fixedly connected with the second plug 6.

The handle 31 is at least partially located outside the connecting sleeve 32, and is capable of pulling the mandrel 33 to drive the second plug 6 away from the second drain opening 151.

A second elastic member 34 assisting the second plug 6 in blocking the second drain opening 151 is connected onto the connecting sleeve 32.

The manual operating member 3 is mainly composed of the handle 31, the connecting sleeve 32, and the mandrel 33, and the connecting sleeve 32 is fixedly mounted in the valve body 1. The connecting sleeve 32 may be fixedly locked on the housing 100 through a locking nut 37.

The handle 31 is partially or wholly located outside the connecting sleeve 32 for a user to operate.

The mandrel 33 passes through the connecting sleeve 32, which is in clearance fit with the connecting sleeve 32. The mandrel 33 may move linearly in an axial direction in the connecting sleeve 32. The mandrel 33 is connected between the handle 31 and the second plug 6.

The second elastic member 34 is connected between the connecting sleeve 32 and the mandrel 33 for driving the mandrel 33 to drive the second plug 6 to block the second drain opening 151. Alternatively, one end of the second elastic member 34 is connected onto the connecting sleeve 32, and the other end of the second elastic member is contacted with the second plug 6 for pushing the second plug 6 to block the second drain opening 151.

The second elastic member 34 may be a spring, a disc spring, an elastic piece, and the like.

The user may operate the handle 31 to pull the mandrel 33 to move outwardly, then the second plug 6 is driven to be away from the second drain opening 151, and the outlet valve starts to discharge water. In the process, the second elastic member 34 is compressed.

A housing limit plate may be arranged on the housing 100 as needed, and a clamping groove is arranged on the handle 31. After the handle 31 is pulled out in place, the handle 31 is rotated, so that the clamping groove is clamped with the housing limit plate, the handle 31 is limited, and the outlet valve may continuously discharge water.

After finishing water discharge, the handle 31 may be pushed inwardly, and the mandrel 33 moves towards the second drain opening 151, thus driving the second plug 6 to block the second drain opening 151. In the process, the second elastic member 34 also assists the second plug 6 in resetting, and assists the second plug 6 in being kept to block the second drain opening 151.

In one of the embodiments, as shown in and FIG. 7, the handle 31 is rotatably connected with the connecting sleeve 32. The handle 31 is provided with a threaded portion 36, and the threaded portion 36 is engaged with a threaded portion in the connecting sleeve 32. A friction between the threaded portion 36 on the handle 31 and the threaded portion in the connecting sleeve 32 is small. The second elastic member 34 is a torsion spring capable of being stretched.

By rotating the handle 31, the handle 31 may move relative to the connecting sleeve 32, thus driving the mandrel 33 and the second plug 6 to move outwardly, so that the second plug 6 is away from the second drain opening 151, and the outlet valve discharges water. In the process, the second elastic member 34 is compressed.

Since the handle 31 is in threaded connection with the connecting sleeve 32, after the handle 31 is rotated to open the second plug 6, the handle 31 may be kept in an open position without automatically retracting, and the outlet valve is kept to discharge water.

After finishing water discharge, the handle 31 is rotated reversely until the second plug 6 blocks the second drain opening 151. In the process, the second elastic member 34 also assists the second plug 6 in resetting, and assists the second plug 6 in being kept to block the second drain opening 151.

Generally, the handle 31 is rotated by half a turn or more than half a turn to drive the mandrel 33 to pull the second plug 6 to be away from the second drain opening 151.

Figure 8:
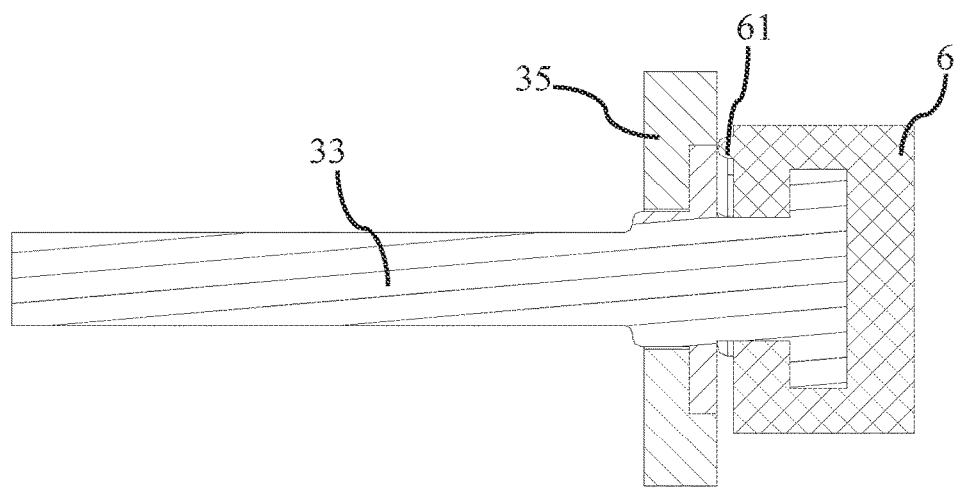
FIG. 8 is a sectional view of a mandrel, a baffle, and the second plug of FIG. 7, according to an exemplary embodiment.

In one of the embodiments, the handle 31 is slidably connected with the connecting sleeve 32. The handle 31 may be slidably connected with the connecting sleeve 32 through a linear guide rail. At the moment, the handle 31 is push-pull type, and when the handle 31 is pulled outwardly, the handle 31 directly pulls the mandrel 33 and the second plug 6 to move outwardly. When the handle 31 is pushed inwardly, the handle 31 directly pushes the mandrel 33 and the second plug 6 to move inwardly. The mandrel 33 and the second plug 6 may also be driven to reset by the second elastic member 34. In one of the embodiments, as shown in FIG. 8, one side of the second plug 6 facing the mandrel 33 is also provided with a baffle 35. The mandrel 33 passes through the baffle 35.

One side of the second plug 6 facing the baffle 35 is provided with at least one elastic convex portion 61.

The baffle 35 may be mounted in the second chamber 152 for limiting a distance of the second plug 6 away from the second drain opening 151. The elastic convex portion 61 plays a role of buffering, preventing the second plug 6 from directly touching the baffle 35.

One end of the second elastic member 34 is connected with the connecting sleeve 32, and the other end of the second elastic member is connected with the baffle 35. The baffle 35 provides a stressed mounted point for the second plug 6, thus avoiding the second elastic member 34 from damaging the second plug 6.

To sum up, the outlet valve provided by the present disclosure can implement the solenoid valve control and the manual control, the waterproof membrane does not need to be opened by a mechanical action in the whole process, and two waterways do not need to be arranged between the water inlet cavity and the water outlet cavity to implement a switching function, so that the outlet valve is simple in structure, convenient to control, and convenient for a user to use.

According to needs, the above technical solutions may be combined to achieve the best technical effect.

The above only describes the principle and the preferable embodiments of the disclosure. It is to be pointed out that for those of ordinary skills in the art, several other modifications can be made on the basis of the principle of the disclosure, which should also be regarded as falling within the scope of protection of the disclosure.

It can be seen from the above description and practice that, compared with the prior art, the switching valve proposed by the present disclosure has the following advantages: the valve body is kept in a normally open state, and by controlling the opening and closing of the diaphragm, the valve can be switched between the first water outlet and the second water outlet to realize the switching of the water flow paths and reduce the influence of water pressure.

Those skilled in the art should understand that the above descriptions are only specific embodiments of the present disclosure and are not intended to limit the present disclosure. Any modification, equivalent replacement and improvements, etc., made within the spirit of the present disclosure should all be included in the protection scope of this disclosure.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure

LIST OF THE REFERENCE NUMERALS IN THE DRAWINGS

1: valve body
2: solenoid valve
3: manual operating member
4: waterproof membrane
5: first plug
6: second plug
7: first elastic member
11: water inlet cavity
12: water outlet cavity
13: water storage cavity
14: first waterway
15: second waterway
16: drain waterway
17: annular separating rib
31: handle
32: connecting sleeve
33: mandrel
34: second elastic member
35: baffle
36: threaded portion
37: locking nut
40: water replenishing mode
41: support
42: rubber gasket
61: elastic convex portion
100: housing
141: first drain opening
142: first chamber
151: second drain opening
152: second chamber
171: water inlet
172: water outlet
200: water inlet connector
300: water outlet connector

What is claimed is:
1. An outlet valve, comprising:
 a valve body, the valve body comprising:
  a water inlet cavity;
  a water outlet cavity;
  a water storage cavity;
  a drain waterway;
  a first waterway coupled to the drain waterway through a first drain opening, the first waterway comprising:

a first plug coupled to an output end of a solenoid valve, the first plug configured for controlling opening and closing the first drain opening;
a second waterway coupled to the drain waterway through a second drain opening, the second waterway comprising:
a second plug coupled to a manual operating member, the second plug configured for controlling opening and closing the second drain opening and biased in a closed position by a second elastic member; and
a waterproof membrane located at least partially in the water storage cavity, the waterproof membrane configured to hermetically separate the water outlet cavity from the water storage cavity;
the solenoid valve coupled to the valve body; and
the manual operating member coupled to the valve body;
wherein the first plug is repositionable along a first direction and the second plug is repositionable along a second direction, the first direction axially opposed to the second direction.

2. The outlet valve of claim 1, wherein the valve body is internally coupled to an annular separating rib, the annular separating rib comprising:
a water inlet coupled to the water inlet cavity, the water inlet configured to abut the water storage cavity;
a water outlet coupled to the water outlet cavity; and
the waterproof membrane positioned on the water inlet.

3. The outlet valve of claim 2, wherein the water storage cavity is also internally coupled to a first elastic member configured for driving the waterproof membrane to move towards the water inlet.

4. The outlet valve of claim 3, wherein the waterproof membrane comprises:
a support coupled to the first elastic member;
a rubber gasket positioned on the support and the annular separating rib; and
a water replenishing hole positioned through the rubber gasket and the support.

5. The outlet valve of claim 1, wherein one end of the first waterway, proximate the first drain opening, comprises a first chamber; and
wherein the first plug is slidably coupled to the first chamber.

6. The outlet valve of claim 1, wherein one end of the second waterway, proximate the second drain opening, comprises a second chamber; and
wherein the second plug is slidably coupled to the second chamber.

7. The outlet valve of claim 1, wherein the manual operating member comprises a handle, a connecting sleeve, and a mandrel, wherein:
the connecting sleeve is coupled to the valve body;
the mandrel is positioned through the connecting sleeve, one end of the mandrel fixedly coupled to the handle and the other end of the mandrel fixedly coupled to the second plug;
the handle at least partially positioned outside the connecting sleeve, the handle configured to pull the mandrel to drive the second plug away from the second drain opening; and
the second elastic member coupled to the connecting sleeve, the second elastic member configured to assist the second plug in blocking the second drain opening.

8. The outlet valve of claim 7, wherein the handle is rotatably coupled to the connecting sleeve.

9. The outlet valve of claim 7, wherein the handle is slidably coupled to the connecting sleeve.

10. The outlet valve of claim 7, wherein one side of the second plug, proximate the mandrel, further comprises a baffle; and
wherein the mandrel passes through the baffle, and wherein one side of the second plug, proximate the baffle, comprises at least one elastic convex portion.

11. An outlet valve, comprising:
a valve body, the valve body comprising:
a water inlet cavity;
a water outlet cavity;
a water storage cavity;
a drain waterway;
a first waterway coupled to the drain waterway through a first drain opening, the first waterway comprising:
a first plug coupled to an output end of a solenoid valve, the first plug configured for controlling opening and closing the first drain opening;
a second waterway coupled to the drain waterway through a second drain opening, the second waterway comprising:
a second plug coupled to a manual operating member, the second plug configured for controlling opening and closing the second drain opening; and
a waterproof membrane located at least partially in the water storage cavity, the waterproof membrane configured to hermetically separate the water outlet cavity from the water storage cavity;
the solenoid valve coupled to the valve body; and
the manual operating member coupled to the valve body, the manual operating member comprising a handle, a connecting sleeve, and a mandrel;
wherein the connecting sleeve is coupled to the valve body;
wherein the mandrel is positioned through the connecting sleeve, one end of the mandrel fixedly coupled to the handle and the other end of the mandrel fixedly coupled to the second plug;
wherein the handle at least partially positioned outside the connecting sleeve, the handle configured to pull the mandrel to drive the second plug away from the second drain opening; and
wherein a second elastic member coupled to the connecting sleeve, the second elastic member configured to assist the second plug in blocking the second drain opening.

12. The outlet valve of claim 11, wherein the handle is rotatably coupled to the connecting sleeve.

13. The outlet valve of claim 11, wherein the handle is slidably coupled to the connecting sleeve.

14. The outlet valve of claim 11, wherein one side of the second plug, proximate the mandrel, further comprises a baffle; and
wherein the mandrel passes through the baffle, and wherein one side of the second plug, proximate the baffle, comprises at least one elastic convex portion.

15. The outlet valve of claim 1, wherein the valve body is internally coupled to an annular separating rib, the annular separating rib comprising:
a water inlet coupled to the water inlet cavity, the water inlet configured to abut the water storage cavity;
a water outlet coupled to the water outlet cavity; and
the waterproof membrane positioned on the water inlet.

16. An outlet valve, comprising:
a valve body, the valve body comprising:
- a water inlet cavity;
- a water outlet cavity;
- a water storage cavity;
- a drain waterway;
- a first waterway coupled to the drain waterway, the first waterway comprising:
  - a first plug coupled to an output end of a solenoid valve, the first plug configured for controlling opening and closing the first drain opening;
- a second waterway coupled to the drain waterway, the second waterway comprising:
  - a second plug coupled to a manual operating member, the second plug configured for controlling opening and closing the second drain opening; and
- a waterproof membrane located at least partially in the water storage cavity;

wherein the solenoid valve and the manual operating member are axially opposed from each other.

17. The outlet valve of claim 16, wherein the valve body is internally coupled to an annular separating rib, the annular separating rib comprising:
- a water inlet coupled to the water inlet cavity, the water inlet configured to abut the water storage cavity;
- a water outlet coupled to the water outlet cavity; and
- the waterproof membrane positioned on the water inlet.

18. The outlet valve of claim 17, wherein the water storage cavity is also internally coupled to a first elastic member configured for driving the waterproof membrane to move towards the water inlet.

19. The outlet valve of claim 18, wherein the waterproof membrane comprises:
- a support coupled to the first elastic member;
- a rubber gasket positioned on the support and the annular separating rib; and
- a water replenishing hole positioned through the rubber gasket and the support.

20. The outlet valve of claim 16, wherein the manual operating member comprises a handle, a connecting sleeve, and a mandrel, wherein:
- the connecting sleeve is coupled to the valve body; and
- the mandrel is positioned through the connecting sleeve, one end of the mandrel fixedly coupled to the handle and the other end of the mandrel fixedly coupled to the second plug.

\* \* \* \* \*